United States Patent [19]

Oliver et al.

[11] E Re. 30,198

[45] Reissued Jan. 29, 1980

[54] CYLINDER LOCK

[75] Inventors: Roy N. Oliver; Elvis C. Flora; Paul A. Powell; Roy C. Spain, all of Salem, Va.

[73] Assignee: Mechanical Development Co., Inc., Salem, Va.

[21] Appl. No.: 843,309

[22] Filed: Dec. 13, 1977

Related U.S. Patent Documents

Reissue of:

[64] Patent No.: 3,499,302
Issued: Mar. 10, 1970
Appl. No.: 627,243
Filed: Mar. 1, 1967

[51] Int. Cl.[2] ..... E05B 15/14; E05B 19/02; E05B 27/04

[52] U.S. Cl. ..... 70/364 A; 70/378; 70/406; 70/409; 70/419

[58] Field of Search ..... 70/362, 363, 364 R, 70/364 A, 365, 366, 376, 377, 378, 392, 406, 407, 409, 419, 420, 421

[56] References Cited

U.S. PATENT DOCUMENTS

| | | | |
|---|---|---|---|
| 457,677 | 8/1891 | Stein | 70/364 R |
| 688,070 | 12/1901 | Denn | 70/362 |
| 1,095,431 | 5/1914 | Sprague | 70/46 |
| 1,222,545 | 4/1917 | Gross | 70/38 C |
| 1,340,804 | 5/1920 | Thompson | 70/378 |
| 1,610,497 | 12/1926 | Douglas | 70/407 |
| 1,932,706 | 10/1933 | Neer | 70/364 A |
| 2,023,847 | 12/1935 | Liss | 70/362 |
| 2,408,283 | 9/1946 | Wollin | 70/419 |
| 2,426,104 | 8/1947 | Johnstone | 70/421 |
| 2,729,091 | 1/1956 | Taylor | 70/364 R |
| 3,035,433 | 5/1962 | Testa | 70/409 |
| 3,070,987 | 1/1963 | Baker | 70/364 A |
| 3,367,156 | 2/1968 | Johnstone | 70/366 |

FOREIGN PATENT DOCUMENTS

| | | | |
|---|---|---|---|
| 153145 | 4/1938 | Austria | 70/419 |
| 381154 | 9/1923 | Fed. Rep. of Germany | 70/376 |
| 529771 | 7/1931 | Fed. Rep. of Germany | 70/419 |
| 1462932 | 11/1966 | France | 70/409 |
| 207599 | 11/1923 | United Kingdom | 70/364 A |

*Primary Examiner*—Robert L. Wolfe
*Attorney, Agent, or Firm*—Sughrue, Rothwell, Mion, Zinn and Macpeak

[57] ABSTRACT

A cylinder lock with a key plug rotatably mounted in the cylinder shell is described. The key plug has a plurality of tumblers that are set by the V bits of a key inserted in the key plug. The key is cut at three different levels and cut at three different angles. Each tumbler in the key plug may be positioned by the properly bitted key reciprocally to clear the shear line and also positioned rotationally to allow the fence to be cammed out of engagement with the cylinder shell. The key plug may then be rotated.

A side bar cylinder lock is also described with the same key cut at three different levels and cut at three different angles. The tumblers are positioned reciprocally and rotationally by the properly bitted key to allow the fence to be cammed out of engagement with the cylinder shell. The key plug may then be rotated.

14 Claims, 11 Drawing Figures

CYLINDER LOCK

Matter enclosed in heavy brackets [ ] appears in the original patent but forms no part of this reissue specification; matter printed in italics indicates the additions made by reissue.

This invention is directed to a cylinder lock, and specifically directed to a new cylinder lock having a new and novel locking arrangement.

Conventional cylinder locks have a plurality of tumblers reciprocally mounted in the key plug. The key plug is rotationally mounted to rotate in the cylinder shell of the cylinder lock. The key plug is engaged in some manner with a locking mechanism with the cylinder shell so that the key plug may not be rotated in the cylinder shell. The reciprocally mounted tumblers operate the locking mechanism. In a pin tumbler cylinder lock, the locking mechanism consists of drivers associated with each tumbler. The drivers are in a driver bible rigidly formed with the cylinder shell. Driver springs normally urge the drivers and tumblers across the shear line between the key plug and cylinder shell, keeping the key plug from rotating in the cylinder shell. The drivers and tumblers may be separated across the shear line by a properly bitted key cut at a plurality of levels, so that the lock is unlocked, and the key plug may be rotated.

A side bar cylinder lock uses a locking mechanism consisting of a fence slidably engaged in a lateral slot in the key plug which is normally urged into engagement with the cylinder shell to keep the key plug from rotating within the cylinder shell. Each tumbler has a circular groove which may be termed a true gate, at a predetermined level so that by the insertion of a properly bitted key cut at a plurality of levels, the tumblers may be reciprocally moved to present all of the circular true gates to the fence. The fence may then be cammed out of engagement with the cylinder shell and the tip of the fence move in the true gates so that the key plug is unlocked.

The number of key changes possible in these cylinder locks is determined by the number of tumblers in the key plug, and the number of bitting levels in the operating key. The number of key changes refers to the number of different keys possible. For instance, in a cylinder lock with five levels, and five tumblers, it would theoretically be possible to have 3125 key changes. A number of these possible key changes must immediately be struck because backing of the key out of the lock would simultaneously raise all of the tumblers to the next higher level and unlock the lock in some combinations. Because of manufacturing tolerances and undesirable key cuts, the actual number of key changes possible is as low as one to two percent of the theoretically possible key changes. Thus there may actually only be thirty to sixty actual key changes in a five bitted level, five tumbler locks.

Due to conditions which arise in the construction of the lock parts under customary manufacturing tolerances, it is possible to effect minute rotary displacement of the key plug from its normal locked positions and thereby produce a slight offset shoulder formation or ledge by the key plug at the shear line between the key plug and the wall of the key plug accommodating bore, which will catch and support the edge of the lower end of the driver when tumblers are elevated. This property of the locks is taken advantage of in lock "picking" procedures by applying a special torque wrench to the key plug to force or stress the key plug in an angular direction about its axis of rotation and then manipulating the tumblers by a picking tool inserted into the key slot to individually lift the tumblers until the drivers catch on the shoulder or ledge formed when the key plug is thus stressed. When all of the drivers have been thus caught in the elevated position, the key plug can be turned to unlock the lock.

The locks may also be opened by "key jiggling" a lock, using a small group of select keys. These keys are then used by inserting a selected key in the key hole, pushing it in and out, torqueing it, with all of these motions carried out simultaneously, until one of the select group of keys opens the lock.

It is therefore an object of this invention to provide a new and improved cylinder lock having a significantly greater number of actual key changes.

Another object of this invention is to provide a new and improved cylinder lock which is difficult, if not impossible, to pick.

In summary, a new and improved lock with an accompanying key has been described. The cylinder lock operated by a single cut key has a cylinder shell, a key plug normally engaged in the cylinder shell, a first locking means operated by the single cut of the key, and a second locking means operated by the single cut of the key, so that the first and second locking means operated by the single cut on the key disengage the key plug from the cylinder shell.

A locking means is disclosed which may be operated by an angularly displaced tumbler. The single cut key is bitted angularly from the horizontal axis of the key.

This invention is set forth with particularity in the appended claims. The principles and characteristics of the invention, as well as other objects and advantages are revealed and discussed through the medium of the illustrative embodiments appearing in the specification and drawings which follow.

Figure 9:
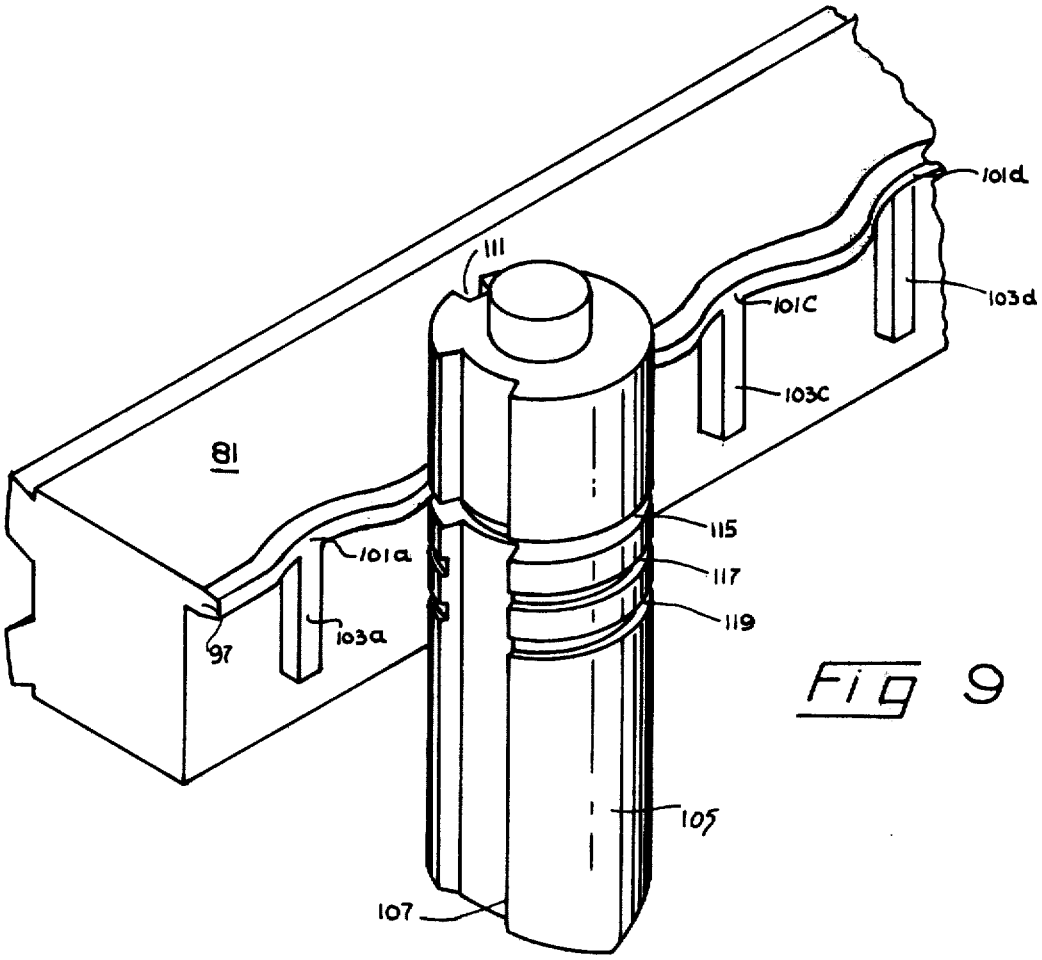
FIG. 9 is an enlarged perspective view of a portion of the key plug of a side bar cylinder lock.

FIG. [10] *11* is a transverse cross sectional view of the side bar cylinder lock shown in FIG. 9;

FIG. [11] *10* is a top view of a tumbler.

Figure 1:
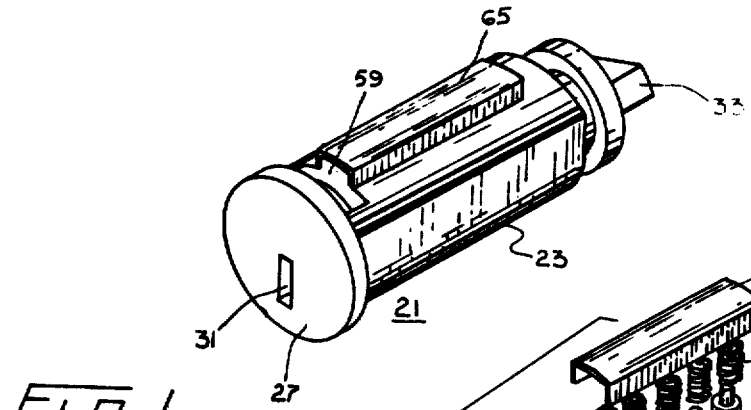
FIG. 1 is a perspective view of an improved cylinder lock constructed in accordance with this invention.
Figure 2:
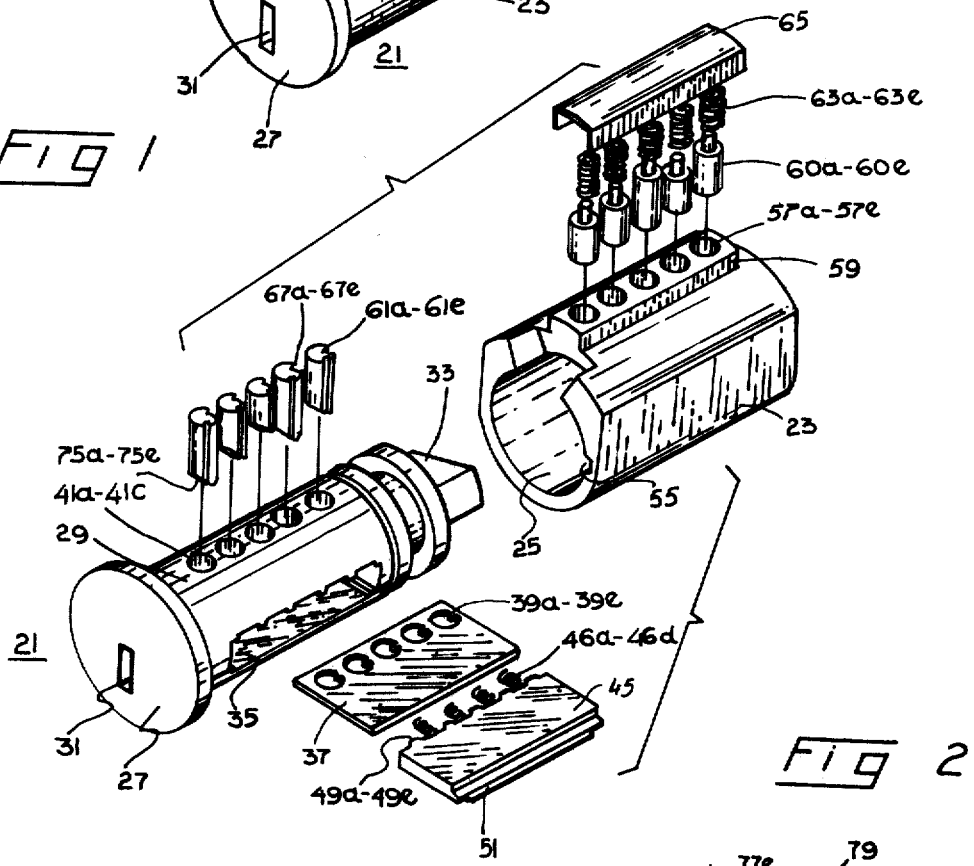
FIG. 2 is a perspective view of the improved cylinder lock showing the different parts of the lock in separated positions.

Referring now to the drawings and specifically to FIGS. 1 and 2, a cylinder lock 21 has a cylinder shell 23 formed with a bore 25 in which an integrally formed head portion 27 and key plug 29 are rotatably mounted. A longitudinal keyway 31 is formed in the key plug 29 and head portion 27. The key plug 29 is formed at its rear end with a stud 33. The stud rotates with the key plug 29 and may be associated with any conventional mechanism, for example, a door bolt retracting mechanism, which may be actuated by rotating the key plug 29 with the proper key inserted in the keyway 31.

The key plug 29 is formed with a laterally opening slot 35, extending substantially perpendicular to the keyway 29. In the slot 35 is a laterally inserted stop plate 37 with five tumbler stops 39a–39e. The five stops are positioned at the rear of each of the five tumbler holes 41a–41e with the five stops 39a–39e parallel to the keyway 31. The five tumbler holes 41a–41e communicate with the longitudinally extending keyway. The tumbler stops 39a–39e function to limit the rotational movement of the five tumblers 61a–61e in a manner to be explained.

A fence member 45 of a substantial length is slidably engaged in the laterally opening slot 35 so that it is laterally movable. A plurality of springs 46a–46d are positioned between the fence 45 and the wall of the keyway 31 to normally urge the fence member 45 out of the fence slot 35. The fence 45 has five gate lugs 49a–49e positioned on the fence 45 so that the five gate lugs 49a—49e may be moved into the corresponding five tumbler holes 41a–41e in a manner which will become evident later in the description. The fence 45 also has an extending cam-like projection 51 at its outer surface which is shaped to engage a cam groove 55 formed in the inner wall of the cylinder wall 23.

The five tumbler holes 41a–41e are longitudinally positioned with five corresponding drive holes 57a–57e in the driver bible 59 when the key plug 29 is inserted in the cylinder shell 23. Five tumblers 61a–61e are inserted in the tumbler holes 41a–41e, five corresponding drivers 60a–60e are inserted in the driver holes 57a–57e, and five corresponding driver springs 63a–63e are inserted in the driver holes 57a–57e. A driver bible plate 65 is then positioned over the driver bible to restrain the driver springs 63a–63e in the driver holes 57a–57e. The driver springs 63a–63e, when restrained, urge the corresponding drivers 60a–60e and tumblers 61a–61e toward the bottom of the corresponding driver holes and tumbler holes.

The sum length of each tumbler and its associated driver is a constant as is standard so that the proper key will raise each driver and its associated tumbler to a position so that each driver is urged into the driver bible 59, and each tumbler remains in the key plug to clear the shear line.

Figure 5:
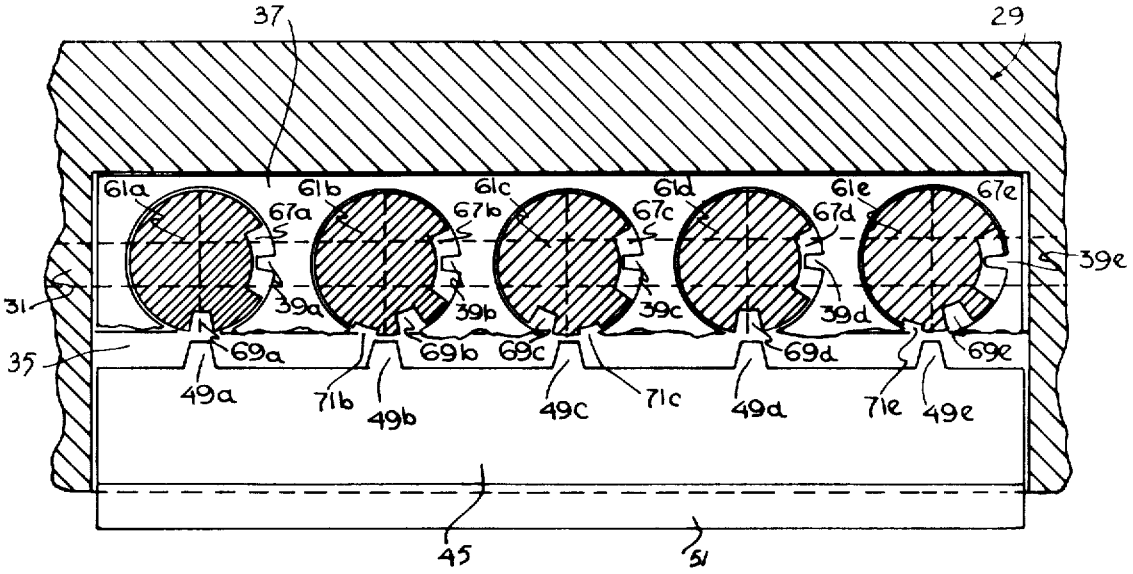
FIG. 5 is a cutaway view of the key plug showing the tumblers in position with the key withdrawn.
Figure 6:
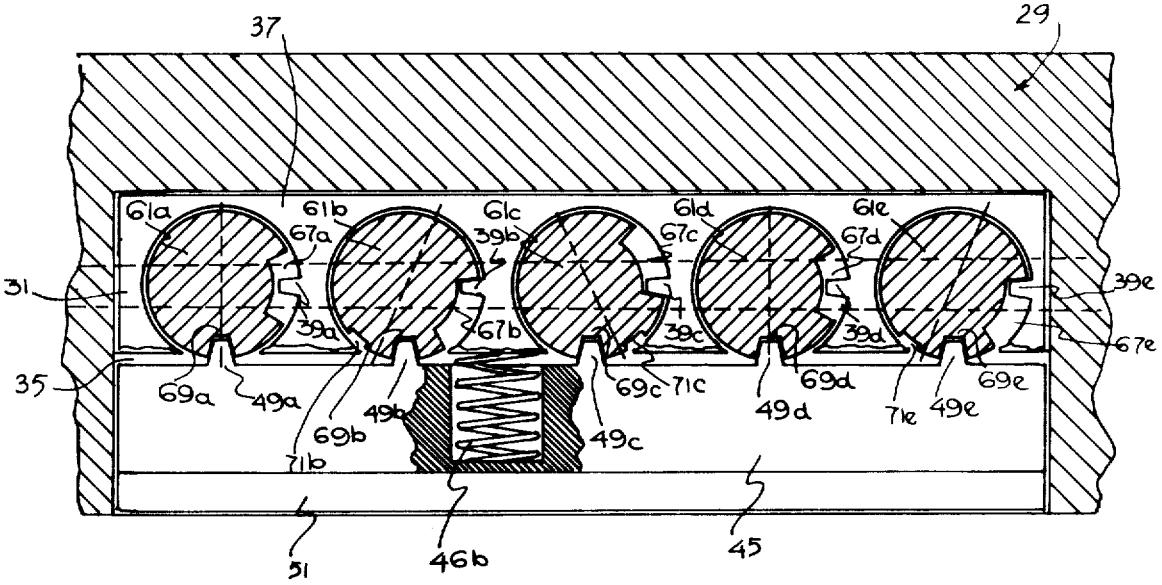
FIG. 6 is a cutaway view of the key plug similar to FIG. 5, but with the tumblers in the position with the key engaged.

As shown specifically in FIGS. 2, 5, and 6, each tumbler 61a–61e has either two or three longitudinal notches. Each tumbler 61a–61e has a wide notch 67a–67e in which a corresponding tumbler stop 39a–39e is positioned to stop the rotational movement of the tumbler when the shoulders of the notches 67a–67e meet the stationary tumbler stops 39a–39e. Each tumbler 61a–61e also has a second longitudinal notch 69a–69e which is termed true gate. Each true gate is wide enough and deep enough to completely engage the corresponding gate lug 49a–49e on the fence 45 when the fence is cammed towards the tumblers 61a–61e. The gate lugs 49e–49d cannot engage the corresponding tumbler true gate 69a–69e until all the tumblers are rotated to position the true gates at right angles to the keyway 31 and are facing the fence 45.

Tumblers 61b, 61c, and 61e also have a third longitudinal notch 71b, 71c, and 71e which is termed a false gate. False gates 71b, 71c, and 71e are deep enough and wide enough to admit merely the tip of corresponding gate lugs 49a, 49c, and 49e as shown in FIG. 6, and not the entire depth of the gate lugs.

In this particular embodiment described herein, the width of the notches 67a–67e is 38 degrees plus the width of the tumbler lug 39a–39e. Thus in FIG. 5 there is a 19 degree separation between each shoulder of a notch 67a–67e and its corresponding tumbler stop 39a–39e. The true gates 69a and 69d are positioned on their respective tumblers so that they are at right angles to the keyway 31 and facing towards the fence 45 when the tumbler stops 39a and 39d are positioned in the center of notches 67a and 67d. The true gates 69b and 69e are positioned on their respective tumblers so that when tumblers 61b and 61e are rotated clockwise 19 degrees and the tumbler stops 39b and 39e meet the right-hand shoulder of notches 67b and 67e, the true gates 69b and 69e are at right angles to the keyway 31 facing the fence 45. The true gate 69c is positioned on its tumbler so that when tumbler 61c is rotated in a counterclockwise direction 19 degrees and the tumbler stop 39c meets the left-hand shoulder of notch 67c, the true gate 69c is positioned at right angles to the keyway 31 facing the fence 45.

False gates 71b and 71e are positioned in the clockwise direction from their associated true gates 69b and 69e so that a counterclockwise rotation of their respective tumblers 61b and 61e will rotate the false gates 71b and 71e to a position where they will face their corresponding fence lugs 49b and 49e. False gate 71c is positioned in a counterclockwise direction from true gate 69c so that clockwise rotation of the corresponding tumbler 61c will rotate the false gate 71c so that it will face its corresponding fence lug 49c. The operation and function of these true and false gates will become evident in the description of the operation of the cylinder lock.

Each tumbler end 75a–75e in the keyway 31 end of the corresponding tumbler hole 41a–41e is formed in a 90 degree chisel tip with the chisel tip perpendicular to a line through the center of the tumbler and the center of the 38 degree notch. The chisel tip is also provided with a twelve degree angle from its center to pass over the developed angles on the steeples of the key 24.

Figure 3:
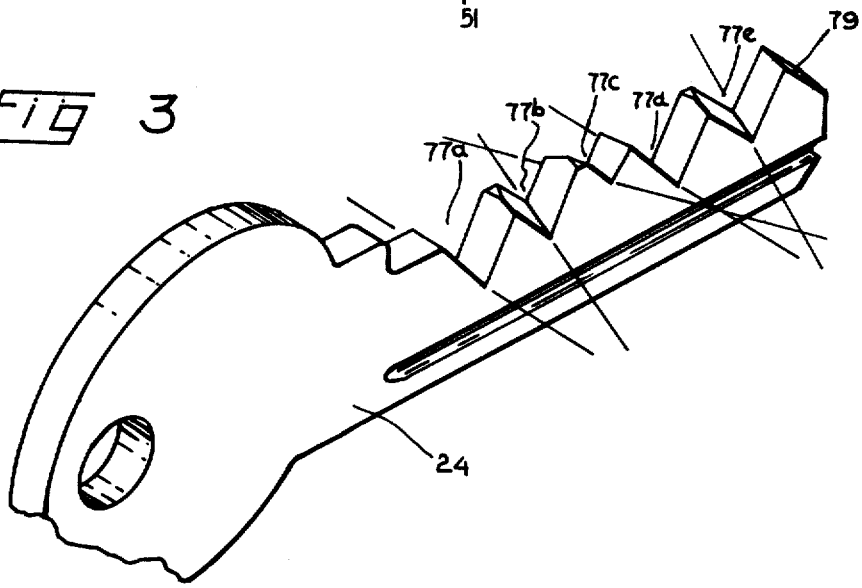
FIG. 3 is a perspective view of the key constructed to operate the cylinder lock shown in FIGS. 1 and 2.

Referring now specifically to FIGS. 2 and 3 for a description of the key 24 corresponding to the cylinder lock shown and described above, the key bittings are cut to three levels, and five V bits 77a–77e are cut in the key 24. V bit 77e is cut to the second level, V bit 77d is cut to the third level. V bit 77c is cut to the first level, V bit 77b is cut to the second level, and V bit 77a is cut to the third level.

The leading edge 79 of the key 24 is cut to a 90 degree angle with the back of the key 24.

V bits 77a and 77d are cut in the conventional manner with the cut perpendicular to the axis of the key 24. This cut will be termed the center cut.

In accordance with this invention, V bits 77b, 77c, and 77e are cut in a unique manner. These V bits are cut at an angle to the center cut. V bit 77b is cut in a clockwise or left direction from the center cut to form a valley 77b forming a 19 degree angle with the center cut V bits 77a and 77d. V bits 77d is also cut in a clockwise or left direction from the center cut to form a valley 77d forming a 19 degree angle with the center cut V bits 77a and 77d.

V bit 77c is cut in a counterclockwise or right direction from the normal center cut to form a valley 77c forming a 19 degree angle with the center cut V bits 77a and 77d.

In the manner described, a key 24 has been angularly bitted at a plurality of angles.

OPERATION

The operation of the cylinder lock shown in FIGS. 1-9 and described hereinbefore will first be described with the insertion of the proper key into the keyway 31 and the resulting rotation of the key plug 29 in the cylinder shell 23.

Key 24 is inserted into the keyway 31 with the perpendicular cut of the leading edge 79 of the key 24 rotating the chisel end 75a-75e of each tumbler 61a-61e to a position perpendicular to the axis of the key 24 and keyway 31. In this manner also at the moment that the leading edge 79 of the key meets the chisel end 75a-75e of each tumbler 61a-61e, the tumbler is positioned so that the tumbler stop 39a-39e is in the center of the corresponding angular notch 67a-67e. This is illustrated well in FIG. 5.

The key 24 is inserted to its full length until the end 79 of the key 24 is stopped by the end of the keyway 31.

Figure 7:
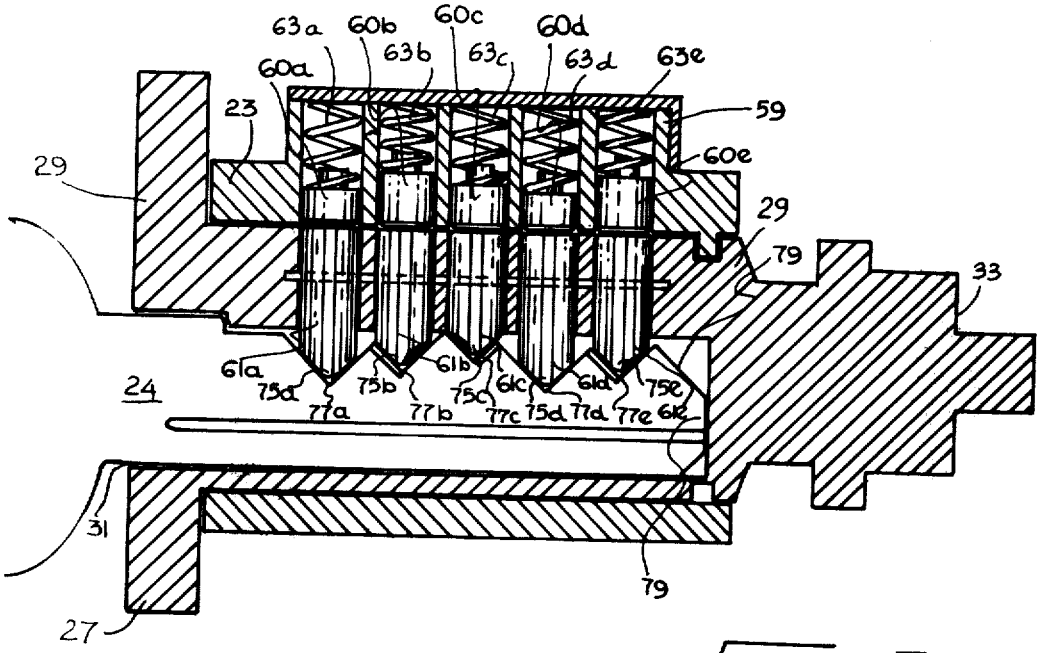
FIG. 7 is a longitudinal cross sectional view of the cylinder lock showing the key properly engaged in the cylinder lock.
Figure 8:
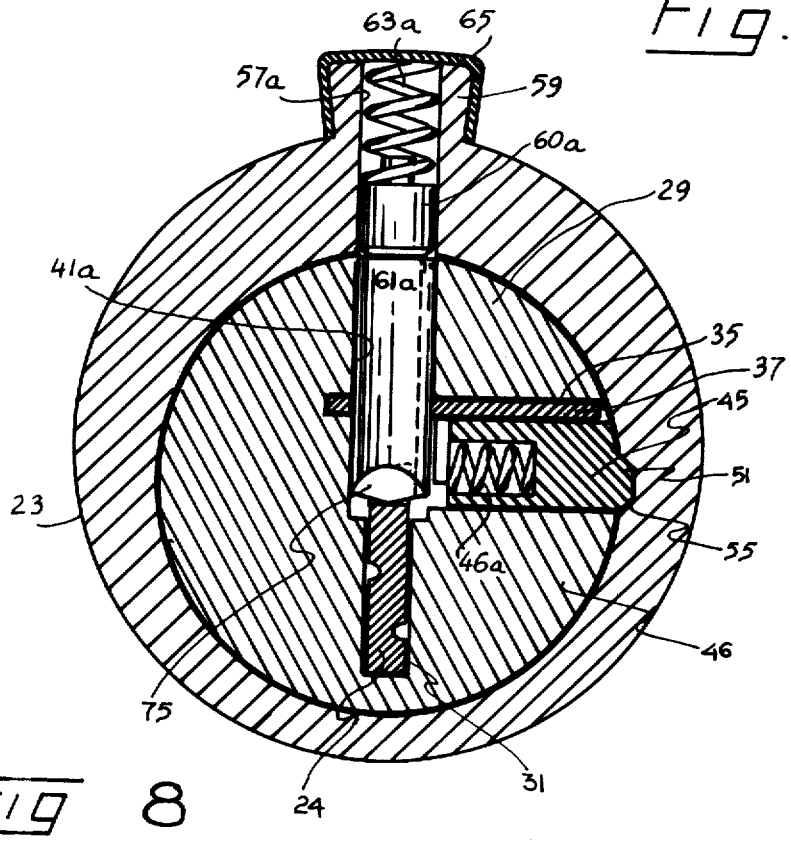
FIG. 8 is a transverse cross sectional view of the cylinder lock with a proper insertion of a key to disengage and turn the key plug.

Referring specifically to FIG. 7, tumbler,61e rests in the second level of V bit 77e so that the top of the tumbler 61e is at the shear line and the corresponding driver 60e is within the driver bible 59. The force of the insertion of the key 24 has urged the tumbler 61e and driver 60e against the driver spring 63e, compressing the driver spring 63e.

Tumbler 61d now rests in the third level of V bit 77d so that the top of the tumbler 61d is at the shear line and the corresponding driver 60d is within the driver bible 59.

Tumbler 61c now rests in the first level of V bit 77c so that the top of the tumbler 61c is at the shear line and the corresponding driver 60c is within the driver bible 59.

Tumbler 61b now rests in the second level of V bit 77c so that the top of tumbler 61b is at the shear line and the corresponding driver 60b is within the driver bible 59.

Tumbler 61a now rests in the third level of V bit 77a so that the top of the tumbler 61a is at the shear line and the corresponding driver 60a is within the driver bible 59.

In the manner described, the key has been inserted and the tumblers 61a-61e now rest in the proper V bits [77c] 77a-*77e* of the proper key so that all of the tumblers 61a-61e are at the shear line and the corresponding drivers 60a-60e are contained completely within their corresponding driver holes in the driver bible 59. Thus there are no tumblers nor drivers obstructing or across the shear line between the cylinder shell 23 and the key plug 29.

However, at this point the fence 45 is still urged away from the keyway 31 by springs 46 so that the cam projection 51 engages the cam groove 55. The key plug cannot be rotated unless the cam projection 51 is moved out of the cam groove 55.

Figure 4:
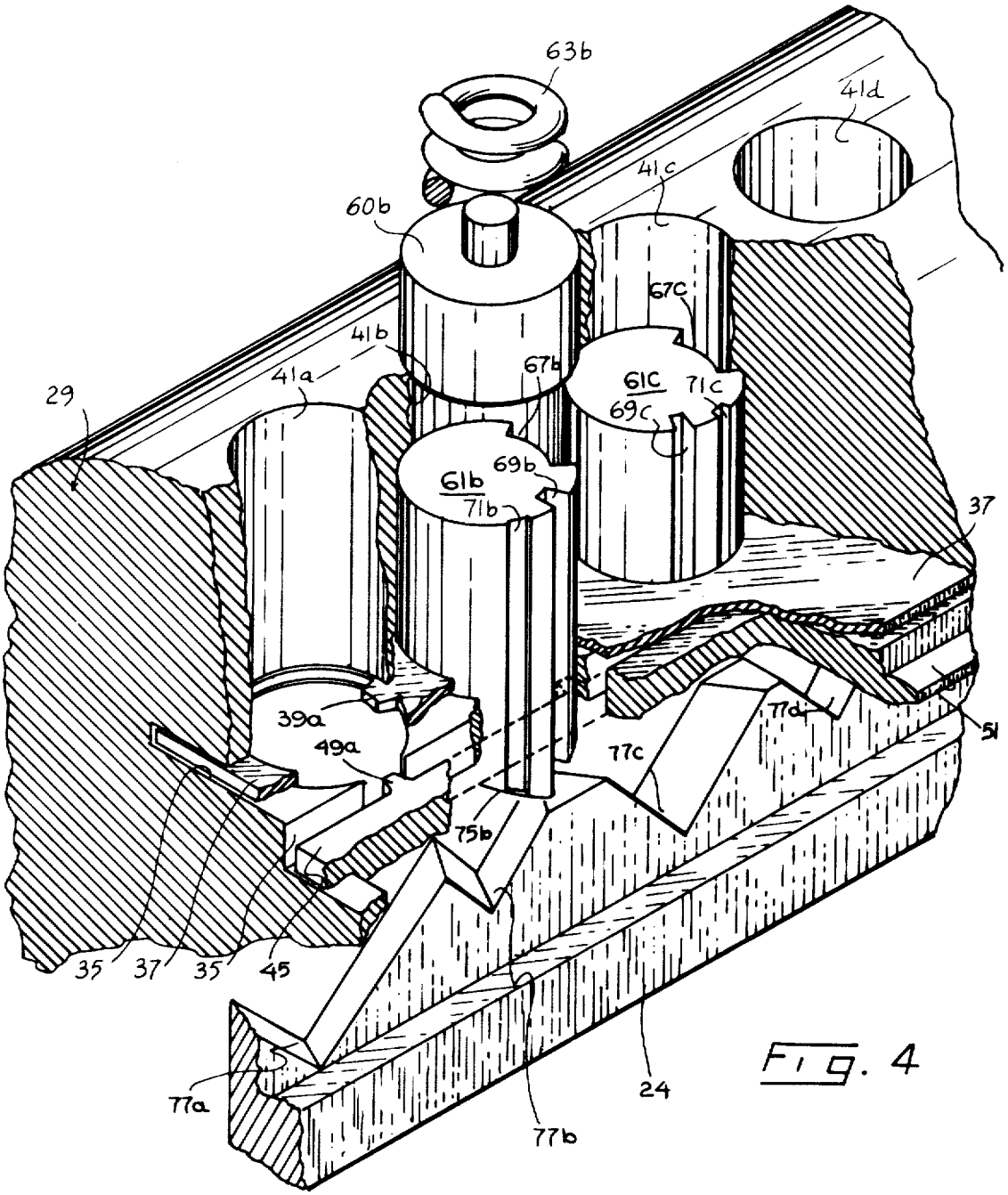
FIG. 4 is an enlarged view of a portion of the key plug assembly with tumblers and associated operating members and key.

Referring specifically now to FIGS. 3, 4, and 6 for a description of the disengagement of the cam projection 51 on the fence 45 from the cam groove 55, bear in mind that three of the V bits of the key 24 are angularly displaced from the two center cut bits.

V bit 77a is a center cut bit cut perpendicular to the axis of the key, so that the chisel end 75a of tumbler 61a rests perpendicular to the keyway 31 as shown in FIG. 6, tumbler stop 39a is in the center of the 38 degree plus retaining notch 67a, and the true gate 69a is perpendicular to the keyway 31 facing the fence lug 49a, so that fence lug 49a may be moved into the true gate 69a.

At this point, note that one fence lug by itself cannot be moved into its corresponding true gate, but all fence lugs must be moved simultaneously into all corresponding true gates.

V bit 77b is a clockwise cut V bit so that the chisel end 75b of tumbler 61b is rotated in a clockwise direction, rotating the tumbler 61b and its corresponding true gate 69b, false gate 71b, and angular notch 67b in a clockwise direction, so that the right shoulder of angular notch 67b is stopped by the tumbler stop 39b. The true gate is thus presented perpendicular to the keyway 31, facing fence lug 49b so that the fence lug 49b may be moved into the true gate 69b.

V bit 77c is a counterclockwise cut V bit so that the chisel end 75c of tumbler 61c is rotated in a counterclockwise direction, rotating the tumbler 61c and its corresponding true gate 69c, false gate 71c, and angular notch 67c in a counterclockwise direction, so that the left shoulder of angular notch 67c is stopped by the tumbler stop 39c. The true gate 69c is thus presented perpendicular to the keyway 31, facing the fence lug 49c so that the fence lug 49c may be moved into the true gate 69c.

V bit 77d is a center cut V bit so that the chisel end 75d of the tumbler 61d rests perpendicular to the keyway 31. Tumbler stop 39d is in the center of the angular notch 67d, and the true gate 69d is perpendicular to the keyway 31 facing the fence lug 49d so that fence lug 49d may be moved into the true gate 69d.

V bit 77e is a clockwise cut V bit so that the chisel end 75e of tumbler 61e is rotated in a clockwise direction, rotating the tumbler 16e and its corresponding true gate 69e, false gate 71e, and angular notch 67e in a clockwise direction, so that the right shoulder of angular notch 67e is stopped by the tumbler stop 39e. The true gate 69e is thus presented perpendicular to the keyway 31 and facing fence lug 49e may be moved into the true gate 69e.

As the proper key has been inserted, all tumblers and drivers now meet across the shear line, and all of the true gates 69a-69e are facing their corresponding fence lugs 49a-49e so that the fence lugs may be moved into their corresponding true gates 69a-69e.

Torque may then be applied to the key 24. The torque urges the key plug 29 either in a clockwise or counterclockwise direction camming the cam projection 51 out of the cam groove 55, urging the fence 45 towards the keyway 31. As the true gates 69a-69e are all presented properly, the fence lugs 49a-49e move into their corresponding true gates 69a-69e, allowing a lateral movement of the fence 45 towards the keyway 31 so that the cam projection 51 cams out of the cam groove 55.

The cylinder lock described herein has thus been unlocked by the combination of three level changes in the V bits of the key to move the tumblers 61a-61e and corresponding drivers 60a-60e to the shear line, and the angular displacement of the tumblers 61a-61e in three angular positions to rotate the true gates 69a-69e so that the fence lugs 49a–49e may be moved into the true gates 69a–69e by camming a cam projection 51 on the fence 45 out of engagement with a cam groove 55 in the cylinder shell 23.

When the key is rotated back to the locked position, and the key removed, the tumblers 61a–61e fall back down so that drivers 60a–60e cross the shear line. When the key is rotated back to the initial position, the springs again urge the fence 45 towards the cylinder shell 23 so that the cam projection 51 engages the cam groove 55 again.

The withdrawal of the key [center] *leading edge* 79 from contact with the chisel end 75a–75e rotates the tumblers 61a–61e back to a position where the chisel ends 75a–75e are perpendicular to the axis of the keyway 31, and rotating the true gates [69a–69e] *69b, 69c, and 69e* so that they are not presented to the corresponding fence lugs [49a–49e] *49b, 49c, 49e.*

The combination of the necessary reciprocating movement of the tumblers and angular rotational movement of the tumblers 61a–61e makes it impossible to engage in "key jiggling" and/or "key picking" possible with cylinder locks where the only locking mechanism is in the reciprocating movement of the tumblers. "Key jiggling" with a standard key will only move the tumblers 61a–61e up and down, and will not rotate the tumblers 61a–61e so that the true gates 69a–69e will not be presented to their proper fence lugs, and the cam projection 51 cannot be cammed out of engagement with cam grooves 55.

The necessary rotational movement of the tumblers 61a–61e to present their true gates 69a–69e also defeats the "picking," for while the tumblers 61a–61e may be moved vertically by a "pick," it is difficult, if not impossible. to also rotate the tumblers 61a–61e. To provide for an extra margin of safety to prevent "picking," the false gates 71b, 71c, and 71e, previously described, are provided. The false gates 71b, 71c, and 71e are large enough to engage merely the tips of the fence lugs 49b, 49c, and 49e. If a "pick" is successful in rotating one of the tumblers 61b, 61c, or 61e, the odds are that one or more of the false gates will be presented to the corresponding fence lug 49b, 49c, or 49e, and upon torque being applied to the key plug 29, the resulting camming action will force the fence lug into the corresponding false gate. The false gate will not allow the fence lug to completely enter the false gate, so that the cam projection 51 cannot be cammed out of the cam groove 55, and the key plug 29 cannot be rotated.

It can readily be seen that the cylinder lock constructed according to this invention can be given a high number of key changes. The secondary locking means resulting from the angular displacement of the tumblers in three positions may be multiplied by the normal primary locking means resulting from the level displacement. It should be evident that the bitting levels of the key can be spaced further apart than in ordinary bitting levels as it is possible to use a smaller number of levels. This reduces the key changes lost due to manufacturing tolerances. Thus it would be possible, for instance, to use three bitting levels plus three angular displacements disclosed herein to give nine changes. With nine changes at each tumbler, using a five tumbler lock, it would be possible to get approximately 60,000 useable lock changes. This is significantly superior to the normal one to two percent useable lock changes out of the theoretically possible lock changes in locks constructed according to previous lock construction.

Figure 11:
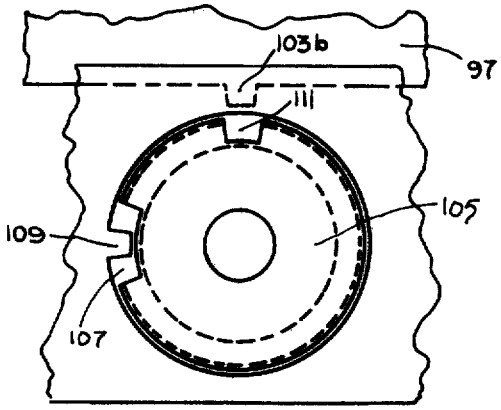
Figure 10:
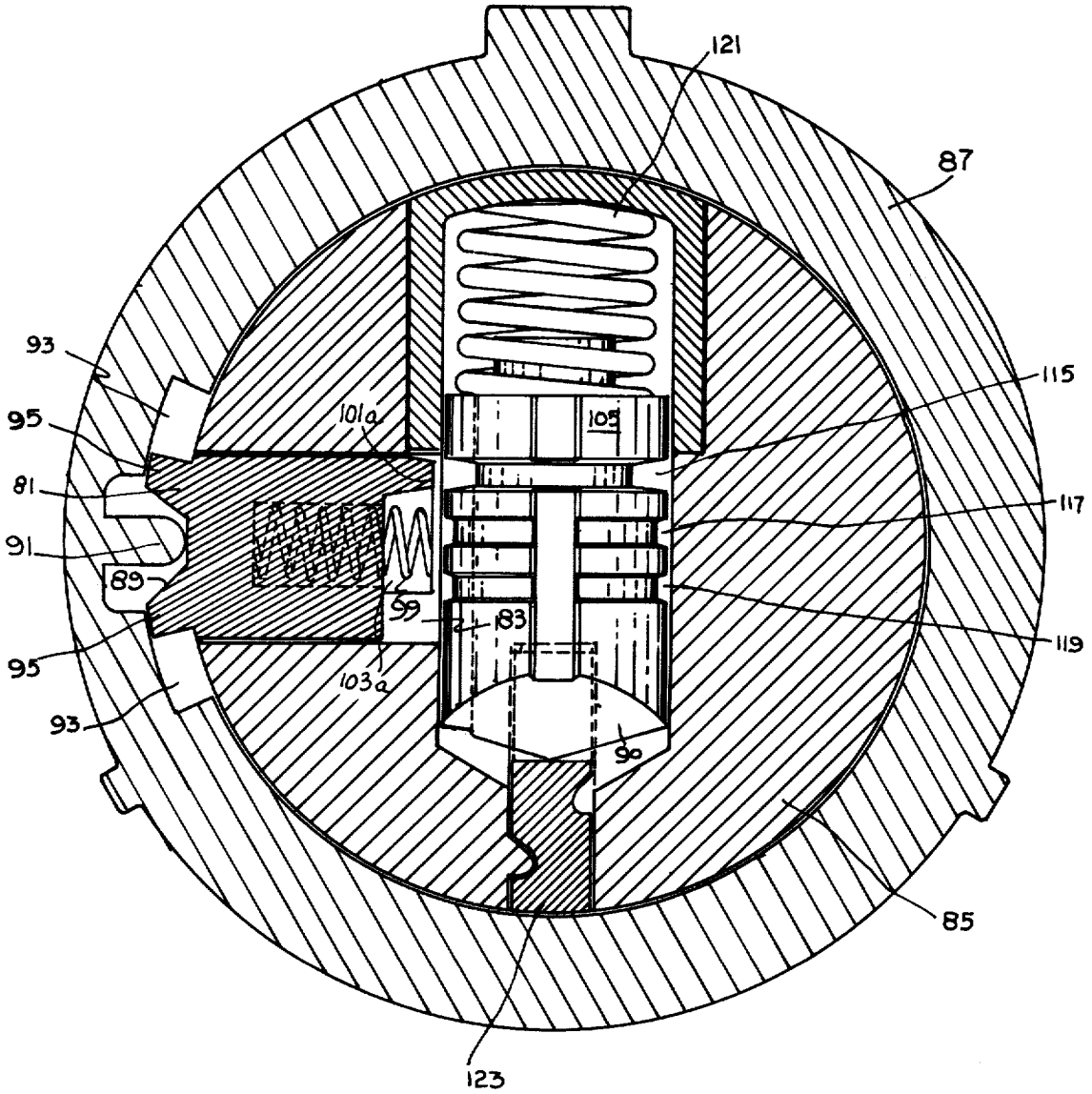

Referring now to FIGS. 9–11, the principles of this invention may be applied to operate a side bar cylinder lock providing a primary and secondary locking means with a single cut on the key. This particular description is directed to a four tumbler, three level bitted, side bar cylinder lock; however, the tumblers and levels may be varied according to the specific desires and needs of an application.

A side bar cylinder lock by its very nature does not have drivers, driver pins, and a driver bible. The side bar cylinder lock does not lock by positioning drivers in a shear line, but locks by providing gates on the tumblers and a fence which may engage the circular gates on the tumblers when the tumblers have been raised to the proper levels by the insertion of a proper key. The fence which is engaged with the cylinder shell may then be cammed out of engagement with the cylinder shell and into engagement with the properly leveled circular gates on the tumblers.

Referring now to FIGS. 9, 10 and 11, therefore a fence 81 is shown positioned in a lateral slot 83 in a key plug 85. The key plug 85 may be rotated in the cylinder lock 87 when the cam slot 89 in the fence is properly cammed into the lateral slot 83 by the bendable cam 91. Bendable cam 91 extends into a recess 93 in the side wall of the cylinder shell 87.

Bendable cam 91 is constructed so that it will cam the fence 81 inward, but it will bend or crush if torque is applied and the fence 81 cannot be moved in towards the keyway 90. A projection 95 from the fence 81 with the cam slot 89 therein also normally extends into the recess 93. A plurality of springs (only one of which is shown) 99 urge the fence projection 95 into the recess 93.

The fence 81 has a top horizontal fence plate 97 with four fence recesses 101a–101d therein, and four vertical fence lugs 103a–103d. Each vertical fence lug 103a–103d is perpendicular to the center of a corresponding horizontal fence recess 101a–101d. Only one tumbler 105 of the four tumblers is shown in FIGS. 9 and 10. The tumbler 105 has the two longitudinal notches shown in the tumblers for the lock shown in FIGS. 1–8, and they perform the same function as described therein. There is an angular notch 107 which is 38 degrees wide plus the width of a tumbler stop 109 and a true gate 111. A false gate is not used as the tumbler rests properly in a center cut V bit.

In addition, there are three circular notches, a true circular gate 115, a false circular gate 117, and a false circular gate 119. Tumbler spring 121 urges tumbler 105 down towards the keyway 90.

A key 123 with the proper V bitting angular displacements as described with relation to the cylinder lock described and shown with relation to FIGS. 1–8 is inserted in the keyway 90. The angular displaced V bittings angularly rotate the chisel end of the tumbler 105, rotating the tumbler 105, so that the angular notch 107 rests with the tumbler stop 109 at the center of angular notch 107. The true gate 111 is then presented at right angles to the angular notch facing the vertical fence lug 103b. The other three tumblers which are not shown are also angular displaced in the angular V bittings so that they also are rotated to present their true gates to their proper vertical fence lug.

The tumbler 105 is also positioned by the level of the V bit in which the chisel end of the tumbler 105 rests. The proper level for tumbler 105 is at level three so that the tumbler rests down in the V bit in the key 123, presenting its true circular gate 115 at a level parallel to the corresponding fence recess 101b.

The other three tumblers are also positioned by the level of the V bit in the proper key 123 so that their circular true gates are also presented at a level parallel to the fence recesses 101a, 101c, 101d.

The key 123 is then turned, applying torque, camming the cam slot 89 by cam 91, moving the fence 81 into the lateral slot 83 towards the keyway 90. The vertical true gates are all presented to the face lugs 103a–103d and the circular true gates are all presented properly to the corresponding fence recess 101a–101d so that the fence 81 can be cammed into the lateral fence slot 83.

The key plug 85 may then be rotated in the cylinder shell 87 and the side bar cylinder lock has been unlocked by a primary and secondary locking means.

This side bar cylinder lock constructed according to this invention offers the same difficulties to "key jiggling" and/or "key picking" that the cylinder lock shown in FIGS. 1–8 offers. In addition, it should be noted that if torque is applied to rotate the key plug 85 without the insertion of the proper key to present all of the true gates properly that the fence lugs and recesses can move into, the cam slot 89 in the fence 81 will bend the bendable cam projection 91 instead of being cammed into the cam slot 83. Further rotation of the key plug 85 will move the fence 81 into engagement with the shoulders of the recess 93 in the cylinder shell 87. The key plug 83 may not be rotated any further so that the attempt to force the lock has failed and a lockout occurs.

The circular false gates 117 and 119 operate in a similar manner to the horizontal false gates shown in FIGS. 1–8. The introduction of a pick into the keyway 90 and the forceable movement of the tumblers upward will tend to present a false gate as often as a true gate.

The usual procedure in "key picking" and/or "key jiggling" a lock is to use a small group of select keys. These keys are used in the following manner. The selected key is inserted in the hole, pushed in and out and torqued, with all of these motions carried out simultaneously, until one of the select group of keys opens the lock. In this lock constructed according to our invention, the key bitting levels are spaced further apart than in conventional keys (which takes care of manufacturing tolerances) and the tumblers have to be angularly displaced. Thus it can readily be seen that the above manipulation ("key picking" and/or "key jiggling") is not practical. The tolerances allowed in the key constructed according to this invention make the reciprocation movement of the tumblers during the manipulation impractical, and the manipulation also tends to spin the tupmblers to an off-gated position.

The combination of the smaller number of bitting levels, and the necessary rotational movement of the tumblers makes the lock difficult, if not impossible, to operate without the properly bitted key.

In the lock constructed according to the principles of this invention, due to the clearance between tumblers, drivers, and their corresponding bores, it is usually possible with the key removed to turn a key plug some eight to twelve degrees clockwise or counterclockwise within the cylinder shell. [we] *We* use this motion to cam the fence member towards the center of the key plug, forcing the projections or fence lugs against the tumbler members themselves. Therefore, when picking attempts are made, the tips or fence lugs of the fence member engage the true and false gates and surfaces in the periphery of the tumblers due to applied torque.

The engagement of the fence lugs of the fence member with the periphery of the tumblers makes it extremely difficult to move and position the tops of the tumblers and the bottoms of drivers to clear the shear line.

If picking has been accomplished so that the tumblers and drivers clear the shear line, it would now be necessary to rotate the tumblers themselves to their correct position so that their true gates would receive the fence lugs. To anyone familiar with this procedure of "lock picking," this necessary positioning of the tumblers and drivers to clear the shear line in combination with the rotational positioning of the tumblers to present their true gates to the fence lugs of the fence is highly improbable, if not impossible.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specic operating environments and conditions.

What is claimed is:

1. In a cylinder lock operated by a proper angularly bitted key, a cylinder shell, a key plug rotationally mounted in said cylinder shell to provide a shear line between said cylinder shell and said key plug, at least one tumbler mounted in said key plug to reciprocate and rotate therein as a whole, at least one driver associated with said tumbler positioned by the reciprocal movement of said tumbler upon engagement with the proper bitted key to clear the shear line, and a fence member blockingly associated with said tumbler and shaped so that the rotational positioning of said tumbler upon engagement with the proper bitted key allows said fence to clear the shear line.

2. The invention as claimed in claim 1 wherein said tumbler has a true gate parallel to the axis of said tumbler, and said fence member is blockingly associated with said true gate of said tumbler and shaped so that the rotational positioning of said tumbler with the proper angularly bitted key allows said fence member to clear the shear line.

3. The invention as claimed in claim 2 wherein means are provided for urging said fence member towards said cylinder shell, and a [cammed] *cam* surface on said fence member normally urged into engagement with said cylinder shell so that upon the proper rotational positioning of said true gates of said tumblers the fence member may be cammed out of engagement with said cylinder shell allowing said fence member to clear the shear line.

4. A cylinder lock and properly angularly bitted key comprising, a cylinder shell, a key plug rotationally mounted in said cylinder shell to form a shear line, a proper angularly bitted key, at least one tumbler reciprocally mounted in said key plug and rotatable therein about an axis, a true gate on said tumbler parallel to the axis of said tumbler, said tumbler and associated driver reciprocally positioned upon engagement with a properly bitted key to clear the shear line, a fence member, said fence member having a first cam surface thereon, a second cam surface on said cylinder shell adapted to cooperate with said first cam surface, means normally urging said fence member towards said cylinder shell so that said first cam surface normally engages said second cam surface, said tumbler shaped to be rotationally positioned upon engagement with said properly angularly bitted key to present said true gate to said fence member so that torque applied to said key plug will cam said fence out of engagement with said cylinder shell.

5. A cylinder lock having a cylinder shell, a key plug rotationally mounted in said cylinder shell, a key with bits formed so that it raises and lowers tumblers and causes rotation of tumblers, at least one tumbler as a whole capable of rotation and [rseciprocal] *reciprocal* movement in said key plug, and a fence member, said tumbler shaped in its rotatable position to either block or free said fence.

6. A cylinder lock, a cylinder shell, a key plug rotatably mounted in said cylinder shell to provide a shear line between said cylinder shell and said key plug, a key shaped with bits formed so that its raises and lowers tumblers and causes rotation of tumblers, at least one tumbler reciprocally mounted in said key plug and rotatably mounted therein about an axis, said tumbler having a first true gates thereof parallel to the axis of said tumbler, a second true gate perpendicular to the axis of said tumbler, and a fence member blockingly associated with said tumbler and shaped so that the rotation and reciprocal positioning of said tumbler upon engagement with the proper shaped key allows said fence to clear the shear line.

7. A key blade having a longitudinal axis of insertion, said key *blade* having a plurality of V-shaped cuts, at least one V-shaped cut [perpendicular] *perpendicularly* cut across the longitudinal axis of said key blade, and at least one V-shaped cut skew cut across the longitudinal axis of said key blade.

8. A lock, a key having a longitudinal axis of insertion, said key having a plurality of V-shaped cuts of variable depths, said V-shaped cuts [perpendicular] *perpendicularly* and skew cut across the longitudinal axis of said key, [primary] said lock including a *primary* locking means activated by the perpendicular and skew cuts of said V-shaped cuts.

9. A tumbler, said tumbler having a cylindrical body, a chisel shaped lower portion, and a true gate thereon parallel to the longitudinal axis of said tumbler, said true gate oriented to said chisel shaped lower portion.

10. The tumbler claimed in claim 9 wherein there is a second true gate thereon [perpendivcular] *perpendicular* to the longitudinal axis of said tumbler.

*11. A cylinder lock having a cylinder shell, a key plug rotationally mounted in said cylinder shell, a key with a plurality of bits including at least one skew cut bit formed so that it raises and lowers pin tumblers and causes rotation of said pin tumblers, at least one said pin tumbler as a whole capable of rotation and reciprocal movement about its own longitudinal axis in said key plug, and a fence member, said tumbler shaped in its rotational position to either block or free said fence.*

*12. A key blade as defined in claim 7 wherein there are a plurality of skew cuts.*

*13. A cylinder lock as in claim 5 wherein the key bits include skew cut bits.*

*14. A cylinder lock as in claim 5 wherein the tumblers are pin tumblers and their rotation and reciprocal movement is about their longitudinal axis.*

* * * * *

UNITED STATES PATENT AND TRADEMARK OFFICE

CERTIFICATE OF CORRECTION

PATENT NO. : Re. 30,198

DATED : January 29, 1980

INVENTOR(S) : Roy N. Oliver, Elvis C. Flora, Paul A. Powell and Roy C. Spain

It is certified that error appears in the above-identified patent and that said Letters Patent is hereby corrected as shown below:

On the cover page of the patent in item [73], after "Salem, Va." there should be inserted, --assignee of Roy C. Spain--

Signed and Sealed this

Twenty-seventh Day of September 1983

[SEAL]

*Attest:*

*Attesting Officer*

GERALD J. MOSSINGHOFF

*Commissioner of Patents and Trademarks*